May 12, 1970   J. N. HARMAN, JR., ET AL   3,511,565
PHOTO APPARATUS HAVING ROTARY FILM TRANSPORT
Filed April 18, 1968   2 Sheets-Sheet 1
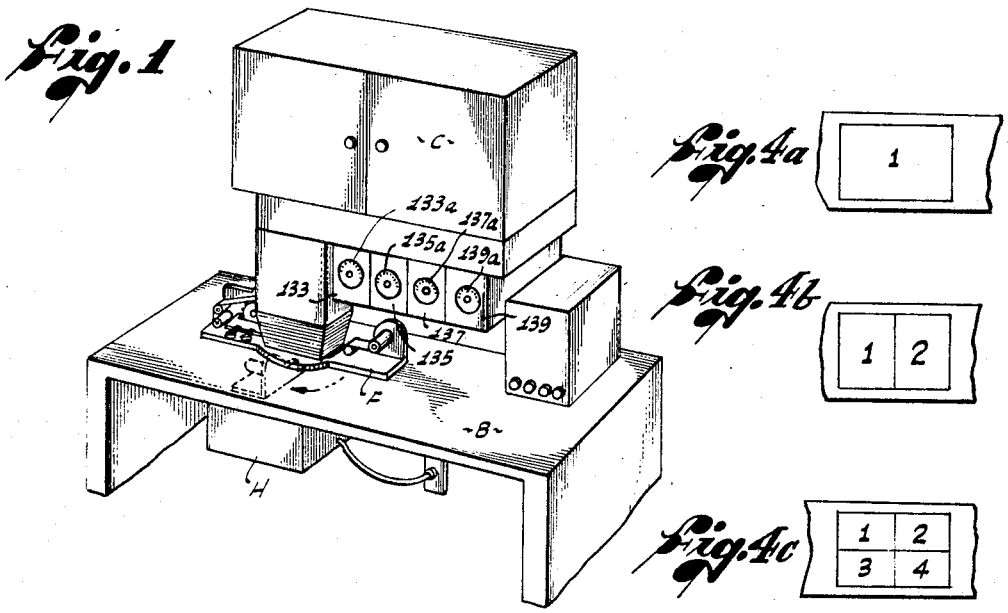
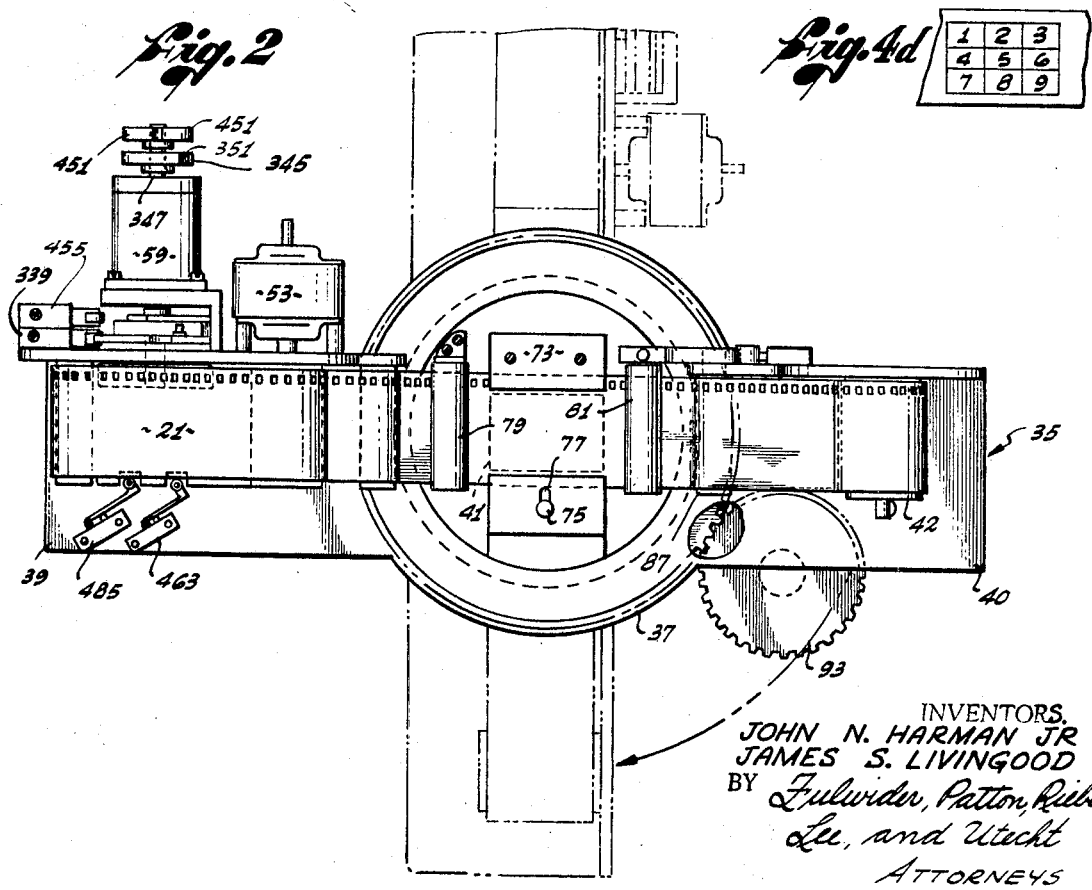
INVENTORS.
JOHN N. HARMAN JR
JAMES S. LIVINGOOD
BY Fulwider, Patton, Rieber, Lee, and Utecht
ATTORNEYS

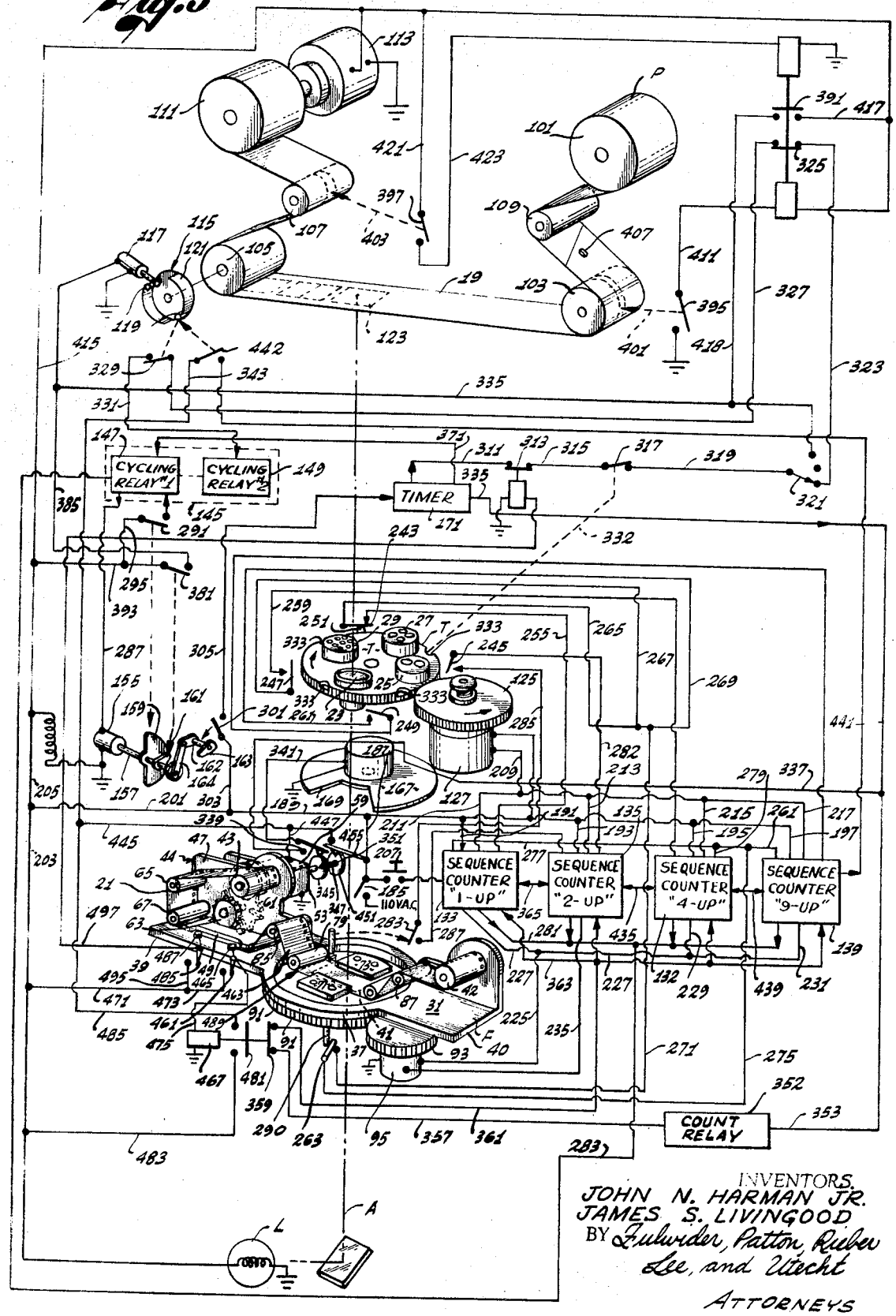

United States Patent Office 3,511,565
Patented May 12, 1970

3,511,565
PHOTO APPARATUS HAVING ROTARY
FILM TRANSPORT
John N. Harman, Jr., La Canada, and James S. Livingood, Reseda, Calif., assignors to Drewry Photocolor Corporation, Burbank, Calif., a corporation of California
Filed Apr. 18, 1968, Ser. No. 722,322
Int. Cl. G03b 27/44, 27/62
U.S. Cl. 355—56      15 Claims

ABSTRACT OF THE DISCLOSURE

Photographic apparatus including paper advance means to selectively move lengths of paper into an exposure area and in alignment with the optical axis of a light beam. A rotary film transport operative to move film into alignment with the optical axis is rotatable from a first position to a second position substantially perpendicular to the first position to effect a 90 degrees change in the orientation of the successive images projected onto the printing paper. A lens mount intermediate the paper advance means and the film transport carries first and second lens clusters for selective disposition in alignment with the optical axis. The apparatus further includes drive and control means for concurrently moving the first lens cluster into the optical axis and the film transport into its first position, and then actuating a light source to project a light beam through the film along the optical axis, and onto the printing paper. The paper advance means then advances the printing paper, the second lens cluster is moved into alignment with the optical axis, the film transport is rotated to its second position, and the light source actuated to project the light beam through the film and onto the printing paper.

BACKGROUND OF THE INVENTION

Field of the invention

The present invention relates to a photographic apparatus for automatically making a first size print on printing paper, and then making a second size print oriented perpendicular to the orientation of the first print.

Description of prior art

Photographic apparatus is presently available for automatically making a predetermined number of prints of each of a predetermined number of sizes from each of a series of photographic negatives. However, such apparatus is incapable of orienting a particular negative in one direction for certain sizes and in a different direction for other sizes. Such a function is desirable since the corresponding orientation of the images on the printing paper enables proportioning and grouping of adjacent images to more efficiently utilize the printing paper and to avoid trimming of the finished photographs.

Frequently in commercial photography, such as in the production of portraits of school children, it is common practice to produce an assortment of sizes of prints for each individual child. In such practice the photographer visits the school and sequentially photographs each child on a roll or strip of film. The film is then developed, and an allotment of prints prepared consisting of a number of prints of different sizes of each student photographed.

The various selected sizes of prints are usually printed by an apparatus having means for moving a single lens or an appropriate cluster of lenses into the path of a light beam directed through each successive negative and onto the printing paper. A printing apparatus of this type is shown in Pat. No. 3,169,441 issued Feb. 16, 1965.

The plurality of smaller size images formed by the plurality of lenses in the lens cluster occupy a rectangular space on the print paper, and it is desirable, in the interests of saving paper and trimming time, that successive images formed by the various lenses occupy a corresponding area on the paper.

More particularly, portraits are usually rectangularly shaped with the longer dimension being the vertical. The print paper area occupied by an enlarged print of such a portrait is often arranged longitudinally of the print paper. This same print paper area can easily be divided into four equal spaces to make four smaller prints, and without any waste of the continuous length of print paper. However, the four smaller images will be oriented in the same direction as the image of the large print. A problem is posed, however, where only two prints are to be printed on the print paper area which would be occupied by one large print, thus necessitating the division of such area into two equal portions. Simply halving the rectangular area normally occupied by the large print would produce two prints disproportionately elongated in the direction of the long dimension of the print paper. Accordingly, it is desirable to be able to orient the double images with their vertical axes extending transversely on the paper which would of course be rotated 90 degrees relative to a single image print or a four image composite print.

SUMMARY OF THE INVENTION

The photographic apparatus of present invention automatically advances lengths of printing paper across an optical axis, orients the negative film so that the image is in a particular orientation relative to the paper, moves a selective lens cluster between the film and the exposure area on the printing paper, projects a beam of light through the film and lens cluster and onto the print paper to make the print. The apparatus then advances a new length of print paper, reorients the film so that the image is in a different orientation relative to the paper, moves a second lens cluster into position for forming a second print oriented differently than the first print.

DESCRIPTION OF THE DRAWINGS

FIG. 1 is a perspective view of a photographic apparatus embodying the present invention;

FIG. 2 is an enlarged horizontal sectional view of the film transport of the photographic apparatus shown in FIG. 1.

FIG. 3 is a schematic view of the photographic apparatus shown in FIG. 1; and

FIGS. 4a through 4d are diagrammatic views of the various sized prints that can be provided by the photographic apparatus shown in FIG. 1.

DESCRIPTION OF THE PREFERRED EMBODIMENT

General arrangement

Referring to FIG. 1, the photographic apparatus of the present invention includes a bench B which supports a cabinet C containing a printing paper transport P (FIG. 3) having a length of printing paper 19 carried thereon. A rotary film transport F is mounted on the bench B for rotation about a generally vertically oriented axis. A lamp housing H depends from underneath the bench B and includes a light source or lamp L for emitting a light beam to be projected upwardly along an optical axis A and through a film 21 carried on the film transport F.

A lens mount or turret T is interposed between the film 21 and the printing paper 19 and carries four lens clusters 23, 25, 27 and 29, the turret T being operative to selectively dispose the clusters in the beam from the light L. When one of the lens clusters 23, 27 or 29 is so disposed, the film transport F will be oriented longitudinally of the bench B, as shown in solid lines in FIGS. 1 and 2. When the lens cluster 25 is disposed in the path of the light beam, the film transport F is oriented perpendicularly to the longitudinal direction of the bench B, as shown in broken lines in FIGS. 1 and 2. Thus, the image or images projected onto the paper 19 will be oriented in one direction for the sets 23, 27 and 29 and perpendicular to that direction for the lens set 25. The terms lens, lens cluster and lens set are used interchangeably to designate the structure interposed in the path of the light beam to alter the direction of the light rays, and comprehend one lens or a plurality of closely grouped lenses, or the like.

Film transport F

The rotatable film transport F includes a plate-like table 35 having a circular central portion 37 and oppositely projecting rectangular wing portions 39 and 40. An aperture 41 is formed centrally in the table 35 and the film 21 is fed thereover from a feed reel 42 to take-up reel 43. A motor mount 44 is secured to the wing portion 39 and includes a vertical back plate 47 and a horizontal base plate 49. The rear of the base plate is hinged from the wing portion 39 whereby the base plate can be raised and laid back for receiving the film 21 thereunder.

A take-up motor 53 is mounted behind the back plate 47 and includes a drive shaft which projects forwardly through the plate 47 for mounting the take-up reel 43. A model 248019 torque motor as sold by Cole Dynamics, Elgin, Ill. has been found acceptable as a take-up motor 53.

A second take-up motor 59 is mounted behind the back plate 47 and drives a Geneva drive 61 which, in turn, drives a sprocket wheel 63 that engages sprocket holes in the film 21. The take-up motor 59 is a slow speed synchronous model SS25, sold under the trade name Slo Syn by Superior Electric, Bridgeport, Conn.

A pair of hold down plates 71 and 73 are mounted adjacent the periphery of the aperture 41 and project over the edges of the film strip 21. As best seen in FIG. 2, the front plate 71 includes a slot 77 and is mounted on the table 35 by means of a bolt 75 extending through the slot. This permits the plate 77 to be slid away from the edge of the film 21 to facilitate loading of the film 21.

A pair of freely rotatable hold-down reels 79 and 81 are disposed at opposite sides of the aperture 41, and are operative to maintain the film 21 firmly on the top surface of the table 35. The central portion of the top surface of the table 35 is depressed and a pair of elevating reels 85 and 87 are disposed outwardly of the hold-down reels 79 and 81 for elevating the film at either side of the depressed central area.

An exterior ring gear 91 underlies and supports the central portion 37 of the table 35 and is engaged by the pinion 93 of a reversible table drive motor 95.

Printing paper transport P

The printing paper transport P includes a feed roll 101, idler roll 103, metering roll 105, tension control rollers 107 and 109, and a take-up roll 111 driven by a continuously running drive motor 113. The metering roll 105 is coupled to a brake 115 for adjusting the advance of paper 19 between exposures. The brake 115 includes an advance solenoid 117 energizable to retract and thereby disengage a cam surface 119 of a cam 121. This frees the metering roller 105 for advancement of the paper 19 while the solenoid plunger rides on the peripheral cam surface. The advance solenoid 117 is only energized momentarily, and immediately after the cam 121 commences rotating, the solenoid projects against the cam and controls the length of paper advanced into the exposure area 123 by engagement with a second cam surface 119 defined by detents on the peripheral surface of the cam 121, such engagement halting rotation of the cam and further advancement of the paper.

Lens turret T

The periphery of the lens turret T includes exterior gear teeth for engagement with a pinion 125 of a drive motor 127. Each time the drive motor 127 receives an impulse it rotates sufficiently to cause the turret to rotate one quarter of a revolution, thereby successively bringing the lens clusters 23, 25, 27 or 29 into alignment with the optical axis.

The drive motor is preferably a slow speed synchronous motor such as the model SS–400 manufactured by Superior Electric, Bridgeport, Conn. If desired, a Geneva drive can be used in conjunction with the motor 127 to provide smooth, accurate operation.

Counters and timing

Four counters 133, 135, 137 and 139 are provided which are each responsive to an electrical starting impulse to transmit a signal which commences an exposure cycle and subsequent advancement of the paper 19. Each counter is operative to count the number of exposures for an associated lens set and, after the appropriate number of counts, transmit a signal to effect advancement of the turret T to its next position. Operation of the counters 133, 135, 137 and 139 is explained in greater detail in the above-mentioned U.S. Pat. No. 3,169,441, and therefore only the functions of the counters will be described herein for brevity.

The starting signal emitted from the respective counters 133, 135, 137 or 139 is transmitted to a relay unit 145 which comprises a pair of mutually exclusive relays 147 and 149. This same signal also starts a cycling or timing motor 155 for rotation of a shaft 157 which mounts a sustaining cam 159 and a paper advance cam 161. A second shaft 162 mounting a timer cam 163 is connected to the shaft 157 by means of a pitman linkage 164. The cycling motor 155 and associated cams 159, 161, and 163 are described only as interlock means to avoid untimely paper advance or exposure and form no part of this invention.

A rotary shutter 167 is disposed across the optical axis A and includes an aperture 169 for passage of light from the lamp L along the optical axis for the desired exposure time, the light passing through the film 21 and onto the paper 19. In the system shown, the exposure time is controlled by a photo exposure control unit or timer 171. Obviously, exposure could also be accomplished by an electronic flash tube projecting a light beam along the optical axis and through the aperture 169 and the following claims are intended to comprehend such an arrangement. If the printing paper 19, lens turret T and film transport 35 are in the proper position, the timer 171 energizes the motor of the shutter 167, causing the aperture 169 to rotate through or across the optical axis at a predetermined speed to expose the printing paper 19 for the desired length of time.

Operation of counter 135 and cycling motor 155

As a preliminary step to operation of the photographic apparatus, a roll of printing paper 19 is installed in the printing paper transport P, the roll of exposed film is installed on the film transport F, and the power on switch 185 is closed. This provides power to the sequence counters 133, 135, 137 and 139 through leads 187, 189, 191, 193 and 197, respectively. This also supplies power to the lamp L through leads 201 and 203, and to the paper advance motor 113 through lead 205. The counters 133, 135, 137 and 139 include respective dials 133a, 135a, 137a and 139a for dialing the desired combination of prints for any one negative frame. A representative combination would be two large prints (FIG. 4a), four medium sized prints (FIG. 4b), four wallet sized prints (FIG. 4c) and nine small prints (FIG. 4d). After such information has been dialed into the respective counters 133, 135, 137 and 139, the start switch 207 is depressed to pulse the counter 133 and initiate printing of a large print. Each of the sequence counters 133, 135, 137 and 139 are connected to the turret drive motor 127 by a common lead 209 and respective leads 211, 213, 215 and 217. The counters 133, 137 and 139 are connected to the film transport motor 95 by a common lead 225 and respective leads 227, 229 and 231. The two photograph or 2-up counter 137 is connected to the film transport drive motor 95 by lead 235. When the one photograph or 1-up counter 133 receives its starting signal it energizes the turret drive motor 127 through lead 209 to rotate the turret one quarter revolution clockwise, as viewed in FIG. 3, to bring the 1-up lens 23 into alignment with the optical axis A. The counter 133 also energizes the film transport drive motor 95 to maintain the transport 35 rotated counterclockwise as viewed in FIG. 3 to thereby maintain the film 21 oriented longitudinally of the printing paper 19.

Four normally open positioning switches 243, 245, 247 and 249 are disposed adjacent the turret T for closure by a peg 251, carried on the turret, whenever the lens cluster 23, 25, 27 or 29 associated with the respective switches is disposed in alignment with the optical axis A. The stationary contacts of the switches 243, 247 and 249 are connected with the counters 133, 137 and 139 by leads 255, 259 and 261, respectively. The movable contacts of switches 243, 247 and 249 are connected with the stationary contact of a normally open film transport position switch 263 by respective leads 265, 267 and 269 and a common lead 271, the movable contact of the switch 263 being connected with the counters 133, 137 and 139 by a common lead 275 and respective individual leads 277, 279 and 281. The movable contact of turret position switch 245 is connected with the counter 135 by a lead 282. The stationary contact of switch 245 is connected with the movable contact of a second normally open film transport position switch 283 by a lead 285, and the stationary contact of switch 283 is connected with the counter 135 by a lead 287.

When the 1-up sequence counter 133 receives its starting pulse it transmits a signal through lead 255 and, if turret position switch 243 is closed, such signal is further transmitted through leads 265 and 271 to film transport switch 263. If the film transport F is correctly positioned, position switch 263 will be closed by a peg 290 projecting below the transport, and such signal will be transmitted through leads 275 and 277 back to counter 133. Receipt of such signal by the counter 133 will verify that both the turret T and film transport F are in position. The counter 133 will then emit a short duration relay actuation pulse through leads 281 and 283 to the first relay 147. This pulse is effective to close relay 147 and open relay 149, relay 147 concurrently passing a power surge to the cycling motor 155 through a lead 287 to initiate CW rotation of shaft 157. Such power surge to the motor 155 is sufficient to rotate it 180°. Just before it ceases rotation, the sustaining cam 159 is rotated under an associated sustaining switch 291 to pass current from lead 203, through leads 293 and 295 and switch 291 to the relay 147 and back out lead 287 to the cycling motor 155, thereby sustaining energization of the first relay 147.

Immediately after sustaining switch 291 has been closed, the timer cam 163 rotates into closing position with timer switch 301 to pass current from leads 201 and 303 through lead 305 to the timer 171. Energization of the timer 171 causes the timer internal relay to close and pass a power pulse through lead 311, film depletion switch 313, lead 315, turret actuated switch 317, lead 319, manual advance switch 321, lead 323, paper splice switch 325, lead 327, paper position switch 329 and lead 331 to the second cycling relay 149. Such pulsing of the second cycling relay 149 closes it and opens the first relay 104 to discontinue passage of current through lead 287 to the cycling motor 155.

The film depletion switch is opened when the end of a film strip is approached and breaks the circuit from the timer 171 to the second relay 149 to discontinue operation. The turret position switch 317 is normally open and is mechanically coupled to the turret T. The switch 317 is closed whenever the follower 332 drops in any one of four turret notches 333 associated with the respective lens clusters 23, 25, 27 or 29. The manual switch 321 can be switched to direct the pulse from the timer 171 directly to the paper advance solenoid 117 through the lead 334 for advancing the paper 19, as will be described hereinafter.

PAPER EXPOSURE

During the time the first relay 147 is open and the cycling motor 155 is stopped, exposure of the paper 19 occurs. The timer is constructed such that if, when its aforementioned internal relay is closed and current is passed to the second relay 149, all the above-described switches 313, 317, 321, 325 and 329 are closed, power is passed through leads 335 and 337 to a film position switch 339 (FIG. 3) and lead 341 to the motor of the shutter 167. The film positioning switch 339 is a normally closed micro-switch having its movable contact riding on a circular cam 345 mounted on the shaft 347 of the film advance motor 59. The cam 345 includes a notch 351 into which the movable contact of the switch 339 drops whenever the advance motor 59 has completed the number of revolutions required to advance the film 21 a full frame, thus completing the circuit from the timer 171 to the shutter motor and rotating the aperture 169 into the optical axis A to pass light from the lamp L, through the film 21, and to the printing paper 19.

A count relay 352 is included in each of the counters 133, 135, 137 and 139 and is connected in parallel with the shutter 167 by a lead 353, such relay being shown separately from the counters for clarity. The power surge emitted to the shutter 167 through lead 335 is also received by the count relay 351. This power surge closes an internal relay in count relay 351 and passes a count signal through lead 357, no-count switch 359 and leads 361 and 363 to counter 133. This count signal energizes the count coil of the counter 133 and registers the count of "one." Since the pre-set count of "two" has not yet been reached, the clutch coil of counter 133 will remain energized and counter 133, after a short period of time, will switch power to the first relay 147 to commence a new printing cycle. After completion of the next print cycle when the pre-set count of "two" is reached and the clutch coil of counter 133 is de-energized, it will pass a start signal through lead 365 to sequence counter 135 to commence printing of the two sets of 2-ups.

Operation of paper transport P

After the first large photo has been printed the printing paper 19 is advanced to bring unexposed paper into the exposure area 123. Thus, a predetermined length of time after the timer 171 emits the power surge to the shutter 167, it emits a signal through lead 371 to the first relay 147, closing it to provide current through lead 287 to cycling motor 155, and opening relay 149 in preparation for the next printing cycle.

During the second one-half revolution of the cycling motor 155 the paper advance switch 161 is rotated against a normally open paper advance switch 381 to pass a surge of power from lead 203 through leads 383 and 385 to the paper advance solenoid 117 to retract its plunger from engagement with the first paper advance cam surface 119. This enables the drive motor 113 to advance the paper 19 a predetermined distance. However, the paper advance switch 381 is only closed momentarily, and the solenoid plunger is biased to its projected position. Thus, when the cam 121 has completed one-half a revolution, the plunger projects to engage the second cam surface 119 and thereby stops the paper advance.

The paper transport P includes circuitry for detecting a splice in the paper 19 and advancing such splice across the exposure area 123 without printing thereon. Such circuitry includes a double acting holding relay that includes the splice feed switch 325 and a splice storage switch 391. The splice detection circuitry also includes a pair of splice detection switches 395 and 397 which include probes 401 and 403, respectively, which ride on the paper 19. Wherever the paper 19 has been spliced, a slot 407 is punched therein. When such splice is fed off the feed roll 101 over the reversing roll 109 and past the switch 395, the probe 401 will fall into the slot 407. This closes switch 395, thus providing a ground for the solenoid of the splice feed switch 325 through lead 411 and opening switch 325 and closing switch 391.

Closure of switch 391 provides power from lead 203, through leads 415, 418 and 335 to the paper advance solenoid 117, which is maintained retracted, thus enabling the drive motor 113 to continuously advance the paper 19 and move the splice across the exposure area. During the time switch 325 is maintained open, breaking the circuit from the timer 171 to the second relay 149, the printing cycle cannot commence, thus avoiding a miscount of the printed photographs. When the splice slot 407 has passed through the exposure area and over the roller 107, the probe 403 will drop into the slot 407. This closes switch 397 to provide power from lead 203 through leads 415, 421 and 423 to the solenoid switch 391, thereby opening switch 391 and returning switch 325 to its closed position. With switch 325 closed the printing cycle may again continue.

Advancement to counters 135, 137 and 139

As mentioned hereinabove, when the pre-set number of larger prints have been printed the counter 133 will signal counter 135 through lead 365. The counter 135 will then emit a power surge to the turret drive motor 127 through leads 213 and 209 to rotate the turret T one quarter turn CW (FIG. 3) to move the lens cluster 25 into the optical axis A and move the peg 251 against the flapper of switch 245 closing it. The counter 135 likewise energizes the film transport drive motor 95 through lead 235 to reverse such motor and rotate the film transport F CW to the position shown in broken lines in FIGS. 1 and 2. CW rotation of the film transfer F is limited by a stop, not shown, and when abutting such stop a peg 431 is in contact with the flapper of switch 283 closing it. The counter 137 emits a signal through lead 782, switch 245, lead 285, switch 263 and back to the counter through lead 287. The counter 135 then signals the first relay 147 through lead 283, closing such relay and recommencing the print cycle.

The count relay 351 of the counter 135 will be actuated twice by the exposure signal from the timer 171 and on the second count, the counter 135 will emit a start signal to counter 137 through lead 435. The counter 435 will then energize the turret motor 127 through leads 215 and 209 to effect another one-quarter CW revolution to bring the lens cluster 27 into the optical axis A and close position switch 247. The counter 137 will also energize the film transport drive motor 95 through leads 229 and 225 to rotate the film transport CCW, as viewed in FIG. 3, and orient the film 21 longitudinally of the printing paper 19. Such re-positioning of the transport F will close transport position switch 290 whereby the signal emitted by the counter 137 will pass through lead 259, switch 247, leads 267 and 271, switch 263 and finally back to the counter through leads 275 and 279. The counter 137 will then pulse the first relay 147 through lead 283 and commence a new printing cycle. When the pre-set number of wallet sized prints have been printed the counter 137 will emit a starting signal through lead 439 to counter 139, thereby commencing printing of the small photos, such printing cycle being substantially as described above.

When the pre-set number of small prints have been printed, the counter 139 will emit a film advance signal through lead 441, paper position switch 442, leads 443, 445 and 347 to the film advance motor 59. The paper position switch 342 is normally open and is closed whenever the advance cam 121 is engaged by the solenoid 117, thus permitting film 21 advance whenever the paper 19 is not advancing. A sustaining cam 451 is mounted on the film advance motor shaft 347, and the flapper of a normally open microswitch 455 rides thereon. When the motor 59 is pulsed, the cam 451 closes the switch 455, passing power from lead 187 through lead 447 to the motor 59 to maintain it energized until it completes a full revolution. The Geneva drive 61 drives the sprocket 63, which advances the film 21 and the slack film is taken up on the take-up reel 43. When the film has advanced to the next frame, the printer automatically repeats the pre-set cycle.

Single frame and paper stop switches

Occasionally it is desirable to make only one large photo and, to conveniently accommodate such a requirement without the necessity of having the photographic apparatus repeat the photographic cycle for all four counters 133, 135, 137 and 139, a single photograph switch 461 is pivotally mounted adjacent the base plate 49. Before the film 21 is installed, the operator cuts a notch 463 a predetermined distance ahead of the negative frame for which only one large print is desired. When the film is advanced to the point where the frame is in the optical axis A the follower 465 of the switch 461 drops into the notch 463, closing the switch and energizing the relay 467 of the no-count switch 359 through leads 203, 471, 473 and 475. When the relay 467 is energized, no-count switch 359 is opened and film advance switch 481 is closed to provide power from lead 203, through leads 483, 485, 445 and 447 to the film advance motor 59. With the no-count switch 359 open, the exposure signal passed through the relay 352 will not be registered in any of the counters, thus avoiding disruption of the programming for the next frame of the film 21.

A film-skip switch 485 is pivotally mounted on the base plate 47 adjacent the switch 461 so that its follower 487 is adapted to fall into a notch 489 cut near the end of the film strip 21. The aforementioned single frame notches 463 are positioned relative to the negative frames such that they are never stopped under the film-skip switch 485, thus avoiding premature actuation thereof. When the film-skip switch 485 is closed, power is supplied to the coil of switch 313 through leads 495 and 497, thus breaking the interlock circuit between the timer 171 and relay 149 and preventing operation of the paper advance P or counters until the next frame of film is moved into photographing position.

To signal the end of roll of film, a pair of notches 463 and 489 are placed in spaced apart relationship, near the end of the film, to cause both switches 461 and 485 to be closed to actuate the respective relays 467 and 313 thereby terminating printer operation.

From the foregoing it will be apparent that the photographic apparatus of the present invention will automatically print a selected combination of different sized prints and will automatically orient the film perpendicular to the printing paper for the 2-up prints, thereby effecting a favorable proportion without waste of print paper, and without extra cutting and trimming.

Various modifications and changes may be made with regard to the foregoing detailed description without departing from the spirit of the invention or the scope of the following claims.

We claim:
1. Photographic apparatus for automatically making first and second sizes of prints, said apparatus comprising:
   paper advance means operative to sequentially advance lengths of print paper into alignment with an optical axis;

a light for projecting a beam of light along said optical axis;

light control means;

film transport means for advancing film to dispose successive frames in said optical axis;

film transport drive mean for orienting said film transport in one position for said first size of prints and in a second position perpendicular to said one position for said second size of prints;

a lens mount intermediate said film transport and said paper advance means;

first and second lens clusters carried on said mount;

lens mount drive means for moving said mount to dispose said first lens clusters in alignment with said optical axis, when said film transport is in said first position, and said second lens cluster in alignment with said optical axis when said film transport is in said second position;

first control means in electrical circuit with said film transport drive and lens mount drive, said first control means being operative to actuate said lens mount drive and said film transport drive to move said first lens cluster into said alignment and rotate said film transport into said first position, said first control means being further operative to generate a control signal and responsive to an electrical signal to generate a start signal;

a second control means in electrical circuit with said lens mount drive and film transport drive, said second control means being responsive to said start signal to actuate said film transport drive and rotate said film transport to said second position and to actuate said lens mount drive to move said second lens cluster into said alignment, said second control means being further operable to generate a second control signal; and timing means in circuit with said paper advance means, light control means and said first and second control means, said timing means being responsive to said first and second control signals to actuate said light control means to expose said printing paper and, after a predetermined time, actuate said paper advance to move a new length of paper into alignment with said optical axis, said timing means being further operable to generate said electrical signal.

2. Photographic apparatus as set forth in claim 1 that includes:

normally open switch means in circuit with said first control means and engageable by said lens mount when said first lens cluster is in alignment with said optical axis to close said switch means and render said first control means operable to generate said control signal.

3. Photographic apparatus as set forth in claim 1 that includes:

normally open switch means in circuit with said first control means and engageable by said film transport when said transport is in its first position to close said switch means to render said first control means operable to generate said control signal.

4. A photographic apparatus as set forth in claim 1 wherein said film is in the form of a strip having a series of negatives and wherein said timing means includes:

means for generating a power surge after said light control has been actuated in response to said second control signal, said photographic apparatus further including:

film advance means on said film transport;

film advance control means responsive to said power surge and including a normally open switch in circuit which said second control means and a cam for maintaining said switch closed for a time sufficient to enable said advance means to advance said film one frame.

5. Photographic apparatus as set forth in claim 1 wherein:

said second control means, after receiving said start signal, is responsive to said electrical signal to generate a second start signal and wherein said apparatus includes:

a third lens cluster on said mount:

third control means in circuit with said lens mount drive, said film transport drive, said second control means, and said timing means, said third control means being responsive to said second start signal and operable to actuate said lens mount drive to move said third lens cluster into alignment with said optical axis and to move said film transport to said first position, said third control means being further operable to generate a control signal to actuate said timer.

6. Photographic apparatus as set forth in claim 5 that includes:

normally open switch means in circuit with said second control means and engageable by said lens mount when said second lens cluster is in alignment with said optical axis to close said switch means and render said second control means operable to generate said second control signal.

7. Photographic apparatus as set forth in claim 5 that includes:

normally open switch means in circuit with said second control means and engageable by said film transport when said transport is in its second position to close said switch means and render said second control means operable to generate said second control signal.

8. Photographic apparatus as set forth in claim 5 that includes:

normally open switch means in circuit with said second control means and engageable by said lens mount when said second lens cluster is in alignment with said optical axis to close said switch means and render said second control means operable.

9. Photographic apparatus as set forth in claim 5 that includes:

normally open switch means in circuit with said first control means and engageable by said film transport when said transport is in its first position to close said switch means to render said first control means operable.

10. Photographic apparatus for automatically making first and second sizes of prints, said apparatus comprising:

paper advance means operative to sequentially advance lengths of print paper into alignment with an optical axis;

a light for projecting a beam of light along said optical axis;

light control means;

film transport means for advancing film to dispose successive frames in said optical axis, said film transport means being movable between one position for said first size of prints and a second position, perpendicular to said one position, for said second size of prints;

film transport drive means for moving said film transport means between said one and second positions;

a lens mount intermediate said film transport and said paper advance means;

first and second lens clusters carried on said mount;

lens mount drive means for moving said mount to dispose said first lens cluster in alignment with said optical axis when said film transport is in said first position and said second lens cluster in alignment with said optical axis when said film transport is in said second position;

electrical control means in electrical circuit with said paper advance means, light control means, film transport means, film transport drive means and lens mount drive means, said control means being operative to actuate said paper advance means to advance a length of print paper into alignment with said optical axis, actuate said film transport means to advance a new frame into said optical axis, actuate said film transport drive means to move said film transport to said one position, actuate said lens mount drive means to move first lens cluster in said optical axis and actuate said light control means and to, thereafter, actuate said paper advance means, actuate said film transport drive means to move said film transport to said second position, actuate said lens mount drive to move said second lens cluster into said optical axis and actuate said light control means.

11. Photographic apparatus as set forth in claim 10 that includes:
   a first stop for stopping said lens mount with said first lens cluster disposed in said optical axis; and
   a second stop for stopping said lens mount with said second lens cluster disposed in said optical axis.

12. Photographic apparatus as set forth in claim 10 that includes:
   a first stop for engaging said film transport and positively stopping it in said one position; and
   a second stop for engaging said film transport and positively stopping it in said second position.

13. Photographic apparatus as set forth in claim 10 wherein:
   said control means includes normally open switch means engaged and closed by said lens mount when said mount is in position with either said first or second lens cluster in said optical axis to enable said light control means to be actuated.

14. Photographic apparatus as set forth in claim 10 wherein:
   said control means includes normally open switch means engaged and closed by said film transport when said film transport is in either said one or second position to enable said light control means to be operated.

15. Photographic apparatus as set forth in claim 10 wherein:
   said film transport is mounted for rotary movement; and
   said apparatus includes a first stop for positively stopping said film transport in said one position; and
   a second stop for positively stopping said film transport in said second position.

References Cited

UNITED STATES PATENTS 3,116,661   1/1964   Holland et al. _____ 95—4.5

NORTON ANSHER, Primary Examiner

R. A. WINTERCORN, Assistant Examiner

U.S. Cl. X.R.

95—4.5; 355—64, 72, 75